(12) United States Patent
Kito

(10) Patent No.: US 10,712,649 B2
(45) Date of Patent: Jul. 14, 2020

(54) LIGHT SOURCE APPARATUS AND PROJECTOR

(71) Applicant: SEIKO EPSON CORPORATION, Tokyo (JP)

(72) Inventor: Satoshi Kito, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/366,027

(22) Filed: Mar. 27, 2019

(65) Prior Publication Data

US 2019/0302593 A1     Oct. 3, 2019

(30) Foreign Application Priority Data

Mar. 28, 2018 (JP) .................... 2018-061409

(51) Int. Cl.
| | |
|---|---|
| G03B 21/14 | (2006.01) |
| H04N 9/31 | (2006.01) |
| G02B 21/20 | (2006.01) |
| G03B 21/20 | (2006.01) |
| G02B 27/14 | (2006.01) |
| G03B 21/00 | (2006.01) |
| G02B 26/00 | (2006.01) |

(52) U.S. Cl.
CPC ......... G03B 21/204 (2013.01); G02B 26/008 (2013.01); G02B 27/141 (2013.01); G03B 21/005 (2013.01)

(58) Field of Classification Search
CPC ...... G03B 21/14; G03B 21/16; G03B 21/006; G03B 21/204; G03B 21/2073; H04N 9/31; H04N 9/3161; H04N 9/3158; F21V 9/14; F21V 9/32; F21V 9/141; F21Y 2115/30; G02B 26/008; G02B 26/0816
See application file for complete search history.

(56) References Cited

U.S. PATENT DOCUMENTS

| | | | | |
|---|---|---|---|---|
| 5,055,737 A | * | 10/1991 | Murata | ........... G03B 21/60 250/483.1 |
| 8,740,390 B2 | * | 6/2014 | Masuda | ........... G03B 21/14 353/31 |
| 10,174,925 B2 | * | 1/2019 | Yamashita | ........... F21V 29/502 |

FOREIGN PATENT DOCUMENTS

JP     2015-069884 A     4/2015

* cited by examiner

*Primary Examiner* — William C. Dowling
(74) *Attorney, Agent, or Firm* — Oliff PLC

(57) ABSTRACT

A light source apparatus according to an aspect of the invention includes an excitation light source that emits excitation light, a wavelength conversion layer on which the excitation light is incident and which converts the wavelength of the excitation light to emit fluorescence, a plurality of traveling direction changers that are formed in the wavelength conversion layer and change the traveling direction of the fluorescence, and a substrate on which the wavelength conversion layer is provided. The substrate is rotated around an axis of rotation to change the position on which the excitation light is incident on the wavelength conversion layer over time, and the interval between the plurality of traveling direction changers is smaller than the size of the region on which the excitation light is incident.

20 Claims, 7 Drawing Sheets

LIGHT SOURCE APPARATUS AND PROJECTOR

BACKGROUND

1. Technical Field

The present invention relates to a light source apparatus and a projector.

2. Related Art

In recent years, some light source apparatuses for projector use fluorescence. Such a light source apparatus includes a phosphor (or wavelength conversion element) that is excited with excitation light outputted from a solid-state light source and incident on the phosphor to emit fluorescence having a wavelength different from the wavelength of the excitation light. As one form of the phosphor, there is a known phosphor wheel attachable to a motor so driven as to rotate. For example, JP-A-2015-069884 discloses a configuration in which a phosphor wheel includes a phosphor plate that emits fluorescence when excited with excitation light and a dielectric multilayer film that transmits the excitation light and reflects the fluorescence is formed on the excitation light receiving surface of the phosphor plate. JP-A-2015-069884 describes that grooves may be formed in a portion of the excitation light receiving surface of the fluorescent wheel (phosphor wheel) that is the portion shifted from the excitation light receiving position toward the center of the fluorescent wheel in such a way that the grooves extend along the circumferential direction of the fluorescent wheel.

In the fluorescence light source apparatus including the phosphor wheel described in JP-A-2015-069884, however, when the phosphor wheel is rotated and a portion where the grooves described above are not present is irradiated with the excitation light, the fluorescence extraction efficiency could undesirably decrease.

SUMMARY

An advantage of some aspects of the invention is to provide a light source apparatus capable of suppressing a decreases in fluorescence extraction efficiency and a projector including the light source apparatus and capable of forming a high-luminance image.

According to a first aspect of the invention, there is provided a light source apparatus including an excitation light source that outputs excitation light, a wavelength conversion layer on which the excitation light is incident and which converts a wavelength of the excitation light to emit fluorescence, a plurality of traveling direction changers that are formed in the wavelength conversion layer and change a traveling direction of the fluorescence, and a substrate on which the wavelength conversion layer is provided. The substrate is rotated around an axis of rotation to change a position on which the excitation light is incident on the wavelength conversion layer over time, and an interval between the plurality of traveling direction changers is smaller than a size of a region on which the excitation light is incident.

In the light source apparatus according to the first aspect, the plurality of traveling direction changers may be so provided as to radially extend from the axis of rotation when viewed in a direction in which the excitation light is incident.

In the configuration described above, a width of the wavelength conversion layer in a radial direction extending from the axis of rotation may be roughly equal to the size of the region on which the excitation light is incident. The rough equality to the region on which the excitation light is incident means that the width of the wavelength conversion layer is greater than or equal to the width of the excitation light incident region by a factor of 1 but smaller than or equal to the width of the excitation light incident region by a factor of 2.

In the light source apparatus according to the first aspect, the plurality of traveling direction changers may be so provided as to be concentric around the axis of rotation.

In the light source apparatus according to the first aspect, the plurality of traveling direction changers may be provided in a form of a lattice when viewed in a direction in which the excitation light is incident.

The arrangement in the form of a lattice includes not only, of course, the case where the lines that form the contours of the traveling direction changers are perpendicular to each other when viewed in the excitation light incident direction but a case where the contours described above intersect with each other at an arbitrary angle and a case where the contours described above do not intersect with each other in the exact sense but the contours are close enough to each other to provide the function of suppressing the lateral spread of the fluorescence.

In the light source apparatus according to the first aspect, the plurality of traveling direction changers may be so formed that a width thereof in a direction along a surface of the wavelength conversion layer that is a surface on which the excitation light is incident decreases with distance from the surface in a direction in which the excitation light is incident.

In the light source apparatus according to the first aspect, the plurality of traveling direction changers may be so formed that a width thereof in a direction along a surface of the wavelength conversion layer that is a surface on which the excitation light is incident increases with distance from the surface in a direction in which the excitation light is incident.

In the light source apparatus according to the first aspect, a surface of each of the plurality of traveling direction changers that is a surface on which the excitation light is incident may be flush with the surface of the wavelength conversion layer that is the surface on which the excitation light is incident.

In the light source apparatus according to the first aspect, a vertex of each of the plurality of traveling direction changers may be flush with the surface of the wavelength conversion layer that is the surface on which the excitation light is incident.

In the light source apparatus according to the first aspect, the plurality of traveling direction changers may be a plurality of grooves formed in the wavelength conversion layer and extending in a direction in which the excitation light is incident.

In the light source apparatus according to the first aspect, the plurality of grooves may each be provided with a light transmissive member and scattering elements held by the light transmissive member.

According to the second aspect of the invention, there is provided a projector including the light source apparatus described above, a light modulator that modulates light from the light source apparatus in accordance with image information to form image light, and a projection system that projects the image light.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
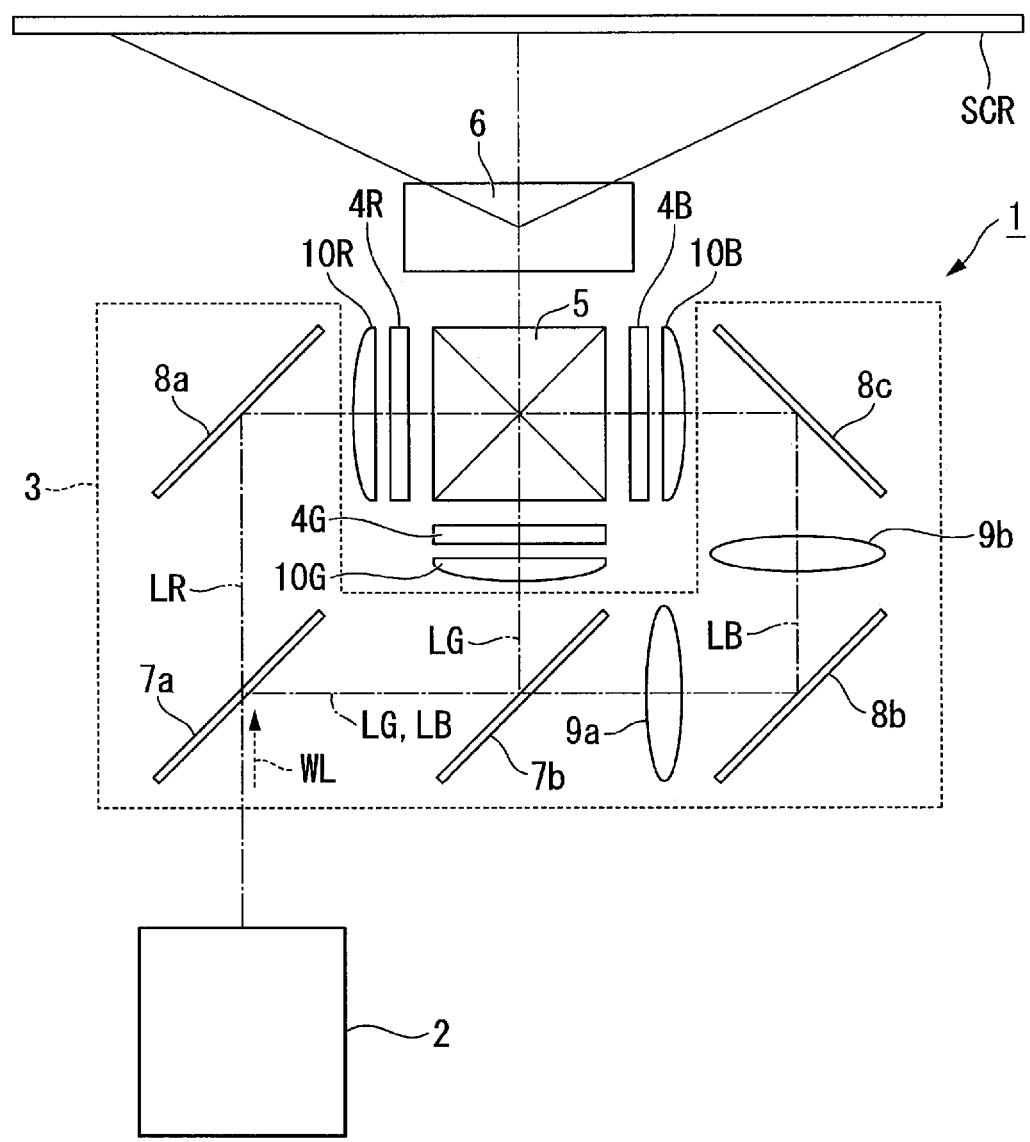
FIG. 1 is a schematic view showing the configuration of a projector according to a first embodiment.

Embodiments of the invention will be described below in detail with reference to the drawings.

In the drawings used in the following description, a characteristic portion is enlarged for convenience in some cases for clarity of the characteristic thereof, and the dimension ratio and other factors of each component are therefore not always equal to actual values.

First Embodiment

An example of a light source apparatus and a projector according to a first embodiment of the invention will first be described. FIG. 1 is a schematic view showing the configuration of a projector 1 according to the first embodiment.

Projector

The projector 1 according to the first embodiment is a projection-type image display apparatus that displays color video images on a screen SCR, as shown in FIG. 1. The projector 1 includes an illuminator 2, a color separation system 3, light modulators 4R, 4G, and 4B, a light combining system 5, and a projection system 6.

Figure 2:
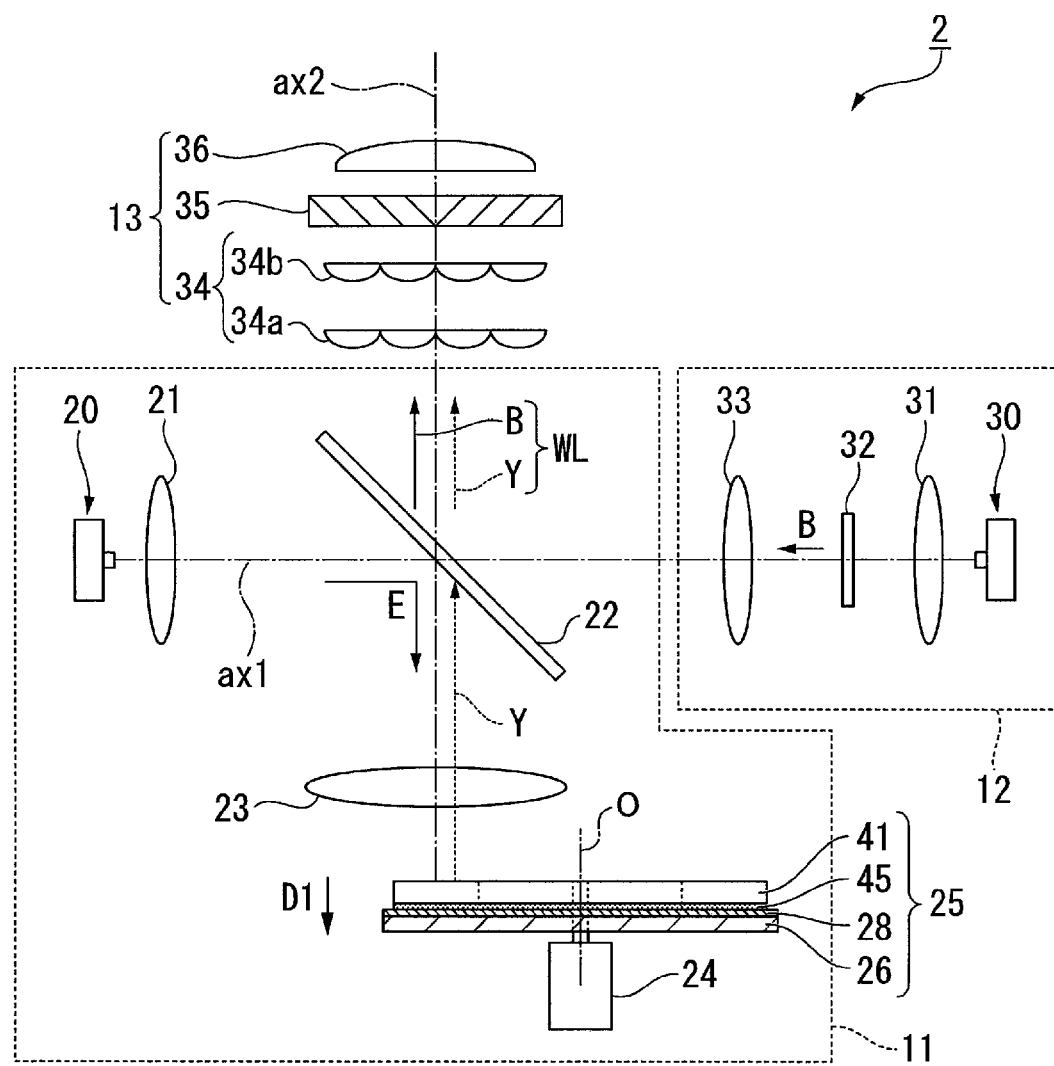
FIG. 2 is a schematic view showing an illuminator of the projector shown in FIG. 1.

The illuminator 2 outputs illumination light WL containing at least light having the three primary colors, that is, red light LR, green light LG, and blue light LB (see FIG. 2). In the present specification, the red light LR refers to visible red light having a peak wavelength longer than or equal to 590 nm but shorter than or equal to 700 nm, the green light LG refers to visible green light having a peak wavelength longer than or equal to 500 nm but shorter than or equal to 590 nm, and the blue light LB refers to visible blue light having a peak wavelength longer than or equal to 400 nm but shorter than or equal to 500 nm.

The color separation system 3 separates the illumination light WL into the red light LR, the green light LG, and the blue light LB. The color separation system 3 includes a first dichroic mirror 7a, a second dichroic mirror 7b, a first total reflection mirror 8a, a second total reflection mirror 8b, a third total reflection mirror 8c, a first relay lens 9a, and a second relay lens 9b.

The first dichroic mirror 7a separates the illumination light WL from the illuminator 2 into the red light LR and the other light (green light LG and blue light LB). The first dichroic mirror 7a transmits the red light LR and reflects the other light (green light LG and blue light LB). On the other hand, the second dichroic mirror 7b reflects the green light LG and transmits the blue light LB to separate the other light described above into the green light LG and the blue light LB.

The first total reflection mirror 8a is disposed in the optical path of the red light LR and reflects the red light LR having passed through the first dichroic mirror 7a toward the light modulator 4R. On the other hand, the second total reflection mirror 8b and the third total reflection mirror 8c are disposed in the optical path of the blue light LB and guide the blue light LB having passed through the second dichroic mirror 7b to the light modulator 4B. The green light LG is reflected off the second dichroic mirror 7b toward the light modulator 4G.

The first relay lens 9a is disposed in the optical path of the blue light LB and on the light incident side of the second total reflection mirror 8b. The second relay lens 9b is disposed in the optical path of the blue light LB and on the light exiting side of the second total reflection mirror 8b. The first relay lens 9a and the second relay lens 9b have the function of compensating optical loss of the blue light LB resulting from the fact that the optical path length of the blue light LB is longer than the optical path lengths of the red light LR and the green light LG.

The light modulator 4R modulates the red light LR in accordance with image information to form image light corresponding to the red light LR. The light modulator 4G modulates the green light LG in accordance with image information to form image light corresponding to the green light LG. The light modulator 4B modulates the blue light LB in accordance with image information to form image light corresponding to the blue light LB.

A transmissive liquid crystal panel is, for example, used as each of the light modulators 4R, 4G, and 4B. Polarizers (not shown in FIG. 1) are disposed on the light incident side and the light exiting side of each of the liquid crystal panels.

Field lenses 10R, 10G, and 10B are disposed on the light incident side of the light modulators 4R, 4G, and 4B, respectively. The field lenses 10R, 10G, and 10B collimate the red light LR, the green light LG, and the blue light LB to be incident on the light modulators 4R, 4G, and 4B, respectively.

The image light from the light modulators 4R, 4G, and 4B enter the light combining system 5. The light combining system 5 combines the image light corresponding to the red light LR, the green light LG, and the blue light LB with one another and causes the combined image light to exit toward the projection system 6. The light combining system 5 is formed, for example, of a cross dichroic prism.

The projection system 6 enlarges the combined image light from the light combining system 5 and projects the enlarged image light toward the screen SCR. Enlarged color video images are displayed on the screen SCR. The projection system 6 is formed, for example, of a lens unit or a projection lens group formed of a lens barrel and a plurality of lenses disposed in the lens barrel.

Illuminator

FIG. 2 is a schematic view showing the configuration of the illuminator 2. The illuminator 2 includes a first light source apparatus 11, a second light source apparatus 12, and a uniform illumination system 13, as shown in FIG. 2.

Light Source Apparatuses

The first light source apparatus 11 includes an excitation light source 20, a collimation system 21, a dichroic mirror 22, a light focusing system 23, and a phosphor wheel 25.

The excitation light source 20 is formed of a semiconductor laser (light emitting device) that outputs blue light (excitation light) E formed of a laser beam as excitation light. The excitation light source 20 may be formed of a single semiconductor laser or a plurality of semiconductor lasers. The excitation light source 20 is so disposed that an optical axis ax1 of the excitation light E before reflected off the dichroic mirror 22 is perpendicular to an illumination optical axis ax2.

The collimation system 21 is formed, for example, of one or more convex lenses and roughly parallelizes the light from the excitation light source 20.

The dichroic mirror 22 is so disposed in the optical path from the collimation system 21 to the light focusing system 23 as to intersect the optical axis ax1 of the excitation light source 20 and the illumination optical axis ax2 by 45°. The dichroic mirror 22 is optically characterized in that it reflects the excitation light E and transmits yellow fluorescence Y containing red light and green light.

The light focusing system 23 is formed, for example, of one or more convex lenses and has the function of causing the excitation light E from the dichroic mirror 22 to enter the phosphor wheel 25 with the excitation light E roughly focused and the function of picking up the fluorescence Y emitted from the phosphor wheel 25.

The phosphor wheel 25 is a reflective rotary fluorescent plate that emits the fluorescence Y in the direction opposite the incident direction of the excitation light E. The phosphor wheel 25 includes a motor 24, a disc-shaped substrate 26, which is so driven by the motor 24 as to rotate around an axis of rotation O, a wavelength conversion layer 41, which is formed on one surface of the substrate 26 along the circumferential direction (rotary direction) and has an annular shape when viewed in the incident direction of the excitation light E, a reflection layer 28, and an adhesive layer 45. The configuration of the phosphor wheel 25 in the first embodiment will be described later.

The second light source apparatus 12 includes a second light source 30, a light focusing system 31, a diffuser 32, and a collimation system 33.

The second light source 30 is formed of at least one semiconductor laser, as is the excitation light source 20 of the first light source apparatus 11. The optical axis of the second light source 30 coincides with the optical axis ax1. The light focusing system 31 is formed, for example, of one or more convex lenses and focuses blue light B outputted from the second light source 30 in the vicinity of the diffuser 32.

The diffuser 32 scatters the blue light B outputted from the second light source 30 in such away that the scattered blue light B has a light orientation distribution similar to the light orientation distribution of the fluorescence Y emitted from the phosphor wheel 25. The diffuser 32 is made, for example, of ground glass.

The collimation system 33 is formed, for example, of one or more convex lenses and collimates the light from the diffuser 32.

The blue light B from the second light source apparatus 12 is reflected off the dichroic mirror 22 and combined with the fluorescence Y having been emitted from the phosphor wheel 25 and having passed through the dichroic mirror 22 to produce white illumination light WL. The illumination light WL enters the uniform illumination system 13.

The uniform illumination system 13 includes an optical integration system 34, a polarization conversion element 35, and a superimposing lens 36.

The optical integration system 34 divides the illumination light WL into a plurality of thin light. The optical integration system 34 is formed, for example, of a first lens array 34a and a second lens array 34b. The first lens array 34a and the second lens array 34b each include a plurality of microlenses arranged in an array.

The illumination light WL having exited out of the optical integration system 34 enters the polarization conversion element 35 in the form of the plurality of thin light fluxes. The polarization conversion element 35 converts the illumination light WL into linearly polarized light. The polarization conversion element 35 is formed, for example, of polarization separation films, retardation films, and mirrors.

The illumination light WL converted into linearly polarized light enters the superimposing lens 36. The superimposing lens 36 superimposes the plurality of thin light fluxes having exited out of the polarization conversion element 35 with one another on an illumination target object. The configuration described above allows the illumination target object to be uniformly illuminated.

Phosphor Wheel

The motor 24 rotates the substrate 26 at a predetermined rotational speed when the projector 1 (see FIG. 1) is used, as shown in FIG. 2. Continuous incidence of the excitation light E on a specific region of a phosphor layer 27 is thus avoided, whereby the life of the phosphor layer 27 is prolonged. The substrate 26 is made of a metal material that excels in heat dissipation, such as aluminum and sapphire.

A surface of the substrate 26 that is the surface on which the excitation light E is incident may be a polished reflection surface or a surface on which a reflection film 28 made, for example, of silver or aluminum is formed.

The wavelength conversion layer 41 is bonded with the adhesive layer 45 made, for example, of silicone to a surface of the reflection surface 28 that is the surface on which the excitation light E is incident. The adhesive layer 45 can also function as a light transmissive member 60, which transmits the excitation light E and the fluorescence Y. To this end, the adhesive layer 45, in a case where it has a predetermined thickness, has a refractive index and optical characteristics that allow the total light transmittance of the excitation light E and the fluorescence Y to be at least 95%.

The wavelength conversion layer 41, on which the excitation light E is incident, converts the wavelength of the excitation light E and emits the fluorescence Y. The wavelength conversion layer 41 is not necessarily made of a specific material and can be made of any material that converts the wavelength of the excitation light E and emits the fluorescence Y as described above. In the first embodiment, the wavelength conversion layer 41 is made, for example, of YAG:Ce, which is a $Y_3Al_5O_{12}$ garnet crystal (YAG) to which a cerium ion ($Ce^{3+}$, for example) is added.

The wavelength conversion layer 41 contains no scattering element. The wavelength conversion layer 41 may contain a scattering element by a slight amount. In this case, however, the content of the scattering element in the wavelength conversion layer 41 is about 4%.

Figure 3:
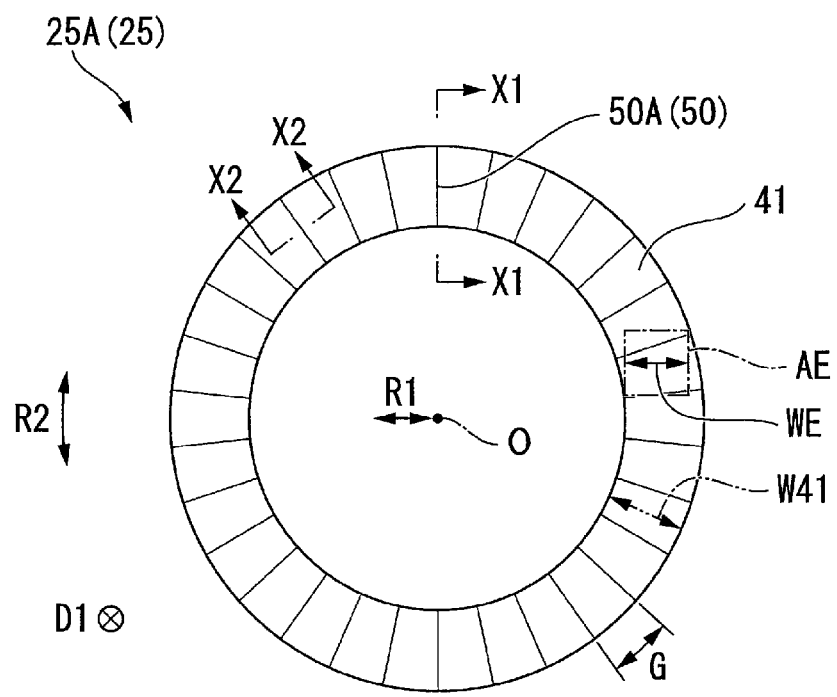
FIG. 3 is a plan view of a phosphor wheel according to the first embodiment and used in a light source apparatus of the illuminator shown in FIG. 2.
Figure 4:
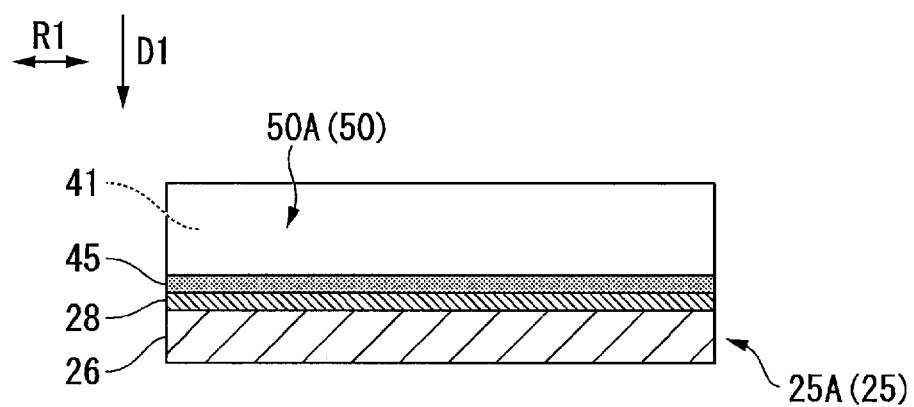
FIG. 4 is a cross-sectional view of the phosphor wheel shown in FIG. 3 taken along the line X1-X1 shown in FIG. 3.
Figure 5:
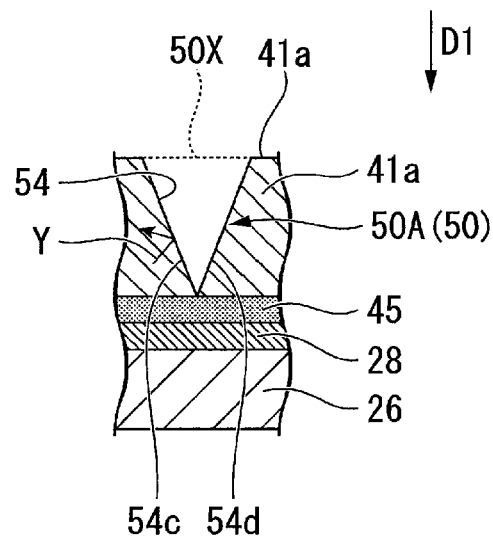
FIG. 5 is a cross-sectional view of the phosphor wheel shown in FIG. 3 taken along the line X2-X2 shown in FIG. 3.

FIG. 3 is a plan view of a phosphor wheel 25A in the first embodiment. FIG. 4 is a cross-sectional view of the phosphor wheel 25A shown in FIG. 3 taken along the line X1-X1 shown in FIG. 3. FIG. 5 is a cross-sectional view of the phosphor wheel 25A shown in FIG. 3 taken along the line X2-X2 shown in FIG. 3. The phosphor wheel 25A includes the wavelength conversion layer 41, the adhesive layer 45, the reflection film 28, and the substrate 26 layered on each other in the present order in a light incident direction D1 of the excitation light E (hereinafter simply referred to as light incident direction D1 in some cases), as shown in FIGS. 3 and 4.

A plurality of traveling direction changers 50 are formed in the wavelength conversion layer 41, as shown in FIG. 3. The traveling direction changers 50 change the traveling direction of the fluorescence Y, as shown in FIG. 5. Traveling direction changers 50A in the first embodiment are so provided as to radially extend from the axis of rotation O when viewed in the light incident direction D1. That is, the plurality of traveling direction changers 50A are formed in a radial direction R1 at predetermined intervals G in a circumferential direction R2.

In the first embodiment, a width W41 of the wavelength conversion layer 41 in the radial direction R1 extending from the axis of rotation O is roughly equal to the width of a light incident region AE, on which the excitation light E is incident. Specifically, the width W41 of the wavelength conversion layer 41 is preferably greater than or equal to a width WE by a factor of 1, which is the width of the light incident region AE, on which the excitation light E is incident, but smaller than or equal to the width WE by a factor of 10. When the width W41 of the wavelength conversion layer 41 falls within the range described above, the wavelength conversion layer 41 is sufficiently irradiated with the excitation light E, and the amount of wavelength conversion layer 41 to be used can be suppressed at the same time.

The predetermined interval G described above is fixed in the circumferential direction R2 but increases with distance from the axis of rotation O in the radial direction R1. The blue light incident region AE has a roughly square shape when viewed in the light incident direction D1, and the width of the light incident region AE in the circumferential direction R2 can be considered to be roughly equal to the width WE. In a case where the light incident region AE, on which the excitation light E is incident, has a fixed width WE, the smaller the interval G, the larger the number of traveling direction changers 50A contained in the light incident region AE, so that the fluorescence Y is unlikely to spread in the direction extending along a surface 41a of the wavelength conversion layer 41, whereby an increase in the size of the region from which the fluorescence Y is emitted (bleeding of fluorescence Y) relative to the size of the light incident region AE can be reduced. When the size of the region from which the fluorescence Y is emitted relative to the size of the light incident region AE increases, etendue defined by the product of the area of the region from which the fluorescence Y is emitted and the angle of divergence of the fluorescence Y increases. When the etendue increases, the optical system (see FIG. 2) disposed on the downstream side of the wavelength conversion layer 41 cannot capture part of the fluorescence Y emitted from the phosphor wheel 25A (wavelength conversion layer 41), possibly resulting in a decrease in the efficiency at which the fluorescence Y is used.

Figure 6:
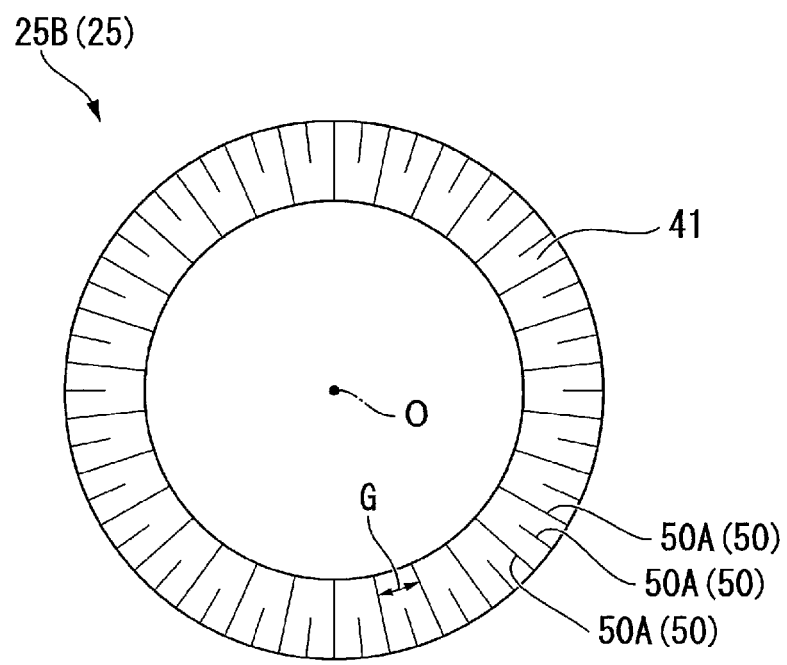
FIG. 6 is a plan view of a variation of the phosphor wheel according to the first embodiment.

From the viewpoint of preferable reduction in the increase in the size of the region from which the fluorescence Y is emitted (bleeding of fluorescence Y) relative to the size of the light incident region AE, the interval G between the traveling direction changers 50A in the periphery of the wavelength conversion layer 41 is preferably not only smaller than at least the light incident region AE but greater than or equal to the width of the light incident region AE by a factor of 0.1 but smaller than or equal to the width of the light incident region AE by a factor of 1.0. In a case where the interval G outside a predetermined position in the radial direction R1 does not fall within the range described above, the traveling direction changer 50A may be added in a position outside the predetermined position in the radial direction R1 in the space between each pair of the traveling direction changers 50A adjacent to each other in the circumferential direction R2, as shown in FIG. 6.

The traveling direction changers 50A are each a groove 54 formed in the wavelength conversion layer 41 and extending in the light incident direction D1, as shown in FIG. 5. The grooves 54 are each formed in a V-letter-like shape in the cross-sectional view taken along the line X2-X2 shown in FIG. 3. That is, the traveling direction changers 50A are so formed that the width thereof in the direction along the surface 41a of the wavelength conversion layer 41, which is the surface on which the excitation light E is incident, decreases with distance in the light incident direction D1 from the surface 41a. The grooves 54 can be formed by wet etching or dry etching using a mask or physical etching, such as ion milling. Instead, the minute wavelength conversion layers 41 each having end surfaces obliquely cut in advance in accordance with the inclination and shape of side surfaces 54c and 54d of each of the grooves 54 may be arranged via the adhesive layer 45 on a surface of the reflection film 28 that is the surface on which the excitation light E is incident. Still instead, the wavelength conversion layer 41 formed in a wheel-like shape in the plan view with no groove can be attached to the substrate 26, and the grooves 54 can be formed by laser processing or scribing.

In the first embodiment, a plane (front plane) 50X of each of the traveling direction changers 50A, which is the plane through which the excitation light E passes, is flush with the surface 41a of the wavelength conversion layer 41. The configuration described above suppresses the lateral spread of the fluorescence Y on the side on which the excitation light E is incident. In a case where the lateral spread of the fluorescence is suppressed to some extent, for example, by the above-mentioned adjustment of the interval G between the traveling direction changers 50A in the circumferential direction R2, the planes 50X of the traveling direction changers 50A may be shifted frontward (toward deeper side) in the light incident direction D1 from the surface 41a of the wavelength conversion layer 41.

The first light source apparatus 11 according to the first embodiment described above provides the following effects.

The first light source apparatus 11 according to the first embodiment includes the excitation light source 20 and the phosphor wheel 25A described above, and the phosphor wheel 25A includes the wavelength conversion layer 41, in which the plurality of traveling direction changers 50A described above are formed, and the substrate 26, on which the wavelength conversion layer 41 is provided and which is rotatable around the axis of rotation O. The rotation of the substrate 26 around the axis of rotation O changes the position on which the excitation light E is incident on the wavelength conversion layer 41 over time. The interval G between the plurality of traveling direction changers 50A, 50A is smaller than the light incident region AE, on which the excitation light E is incident. The configuration described above, in which scattering elements are hardly provided in the wavelength conversion layer 41, can suppress a phenomenon in which when the excitation light E enters the wavelength conversion layer 41, scattering elements prevent the excitation light E from entering the wavelength conversion layer 41, what is called backscattering. Even in the case where the wavelength conversion layer 41 contains no scattering element, or in a case where the wavelength conversion layer 41 contains a slight amount of scattering elements, a plurality of the traveling direction changers 50A are contained in the light incident region AE, on which the excitation light E is incident, when the substrate 26 is rotated around the axis of rotation O and satisfactorily change the traveling direction of the fluorescence Y, whereby an increase in the size of the region from which the fluorescence Y is emitted from the size of a desired region can be suppressed. A decrease in the efficiency of extraction of the fluorescence Y can thus be suppressed.

In the first light source apparatus 11 according to the first embodiment, the traveling direction changers 50A are so provided as to radially extend from the axis of rotation O when viewed in the light incident direction D1. Further, the width W41 of the wavelength conversion layer 41 in the radial direction R1 extending from the axis of rotation O is roughly equal to the size of the light incident region AE, on which the excitation light E is incident. According to the configuration described above, the width W41 is fixed in the circumferential direction R2, and the number of traveling direction changers 50A contained in the region AE, which is irradiated with the excitation light E, does not change when the substrate 26 is rotated, so that the lateral spread of the fluorescence Y can be effectively suppressed, whereby a decrease in the efficiency of extraction of the fluorescence Y can be suppressed.

In the first light source apparatus 11 according to the first embodiment, the traveling direction changers 50A are so formed that the width thereof in the direction along the surface 41a of the wavelength conversion layer 41 decreases with distance in the light incident direction D1 from the surface 41a. Further, the traveling direction changers 50A are the grooves 54 formed in the wavelength conversion layer 41 and extending in the light incident direction D1. According to the configuration described above, the traveling directions of the excitation light E and the fluorescence Y can be changed at the side surfaces 54c and 54d of each of the grooves 54 of the traveling direction changers 50A based on the difference in refractive index between the air in the grooves 54 and the wavelength conversion layer 41. As a result, the lateral spread of the excitation light E and the fluorescence Y can be suppressed, whereby the efficiency at which the excitation light E is used can be increased, and a decrease in the efficiency of extraction of the fluorescence Y can be suppressed.

In the first light source apparatus 11 according to the first embodiment, the planes 50X of the traveling direction changers 50A are flush with the surface 41a of the wavelength conversion layer 41. According to the configuration described above, since the traveling direction changers 50A reach the surface 41a in the thickness direction of the wavelength conversion layer 41, the lateral spread of the excitation light E immediately after the incidence thereof on the wavelength conversion layer 41 and the lateral spread of the fluorescence Y immediately before the exit thereof out of the wavelength conversion layer 41 can be reliably suppressed. A decrease in the efficiency of extraction of the fluorescence Y can therefore be efficiently suppressed. In a case where the efficiency of extraction of the fluorescence Y can be sufficiently suppressed, the planes 50X of the traveling direction changers 50A may be shifted frontward (toward deeper side) in the light incident direction D1 from the surface 41a of the wavelength conversion layer 41.

The projector 1 according to the first embodiment described above provides the following effect.

The projector 1 according to the first embodiment can form and project a high-luminance image by using the first light source apparatus 11, which suppresses a decrease in the efficiency of extraction of the fluorescence Y.

Figure 7:
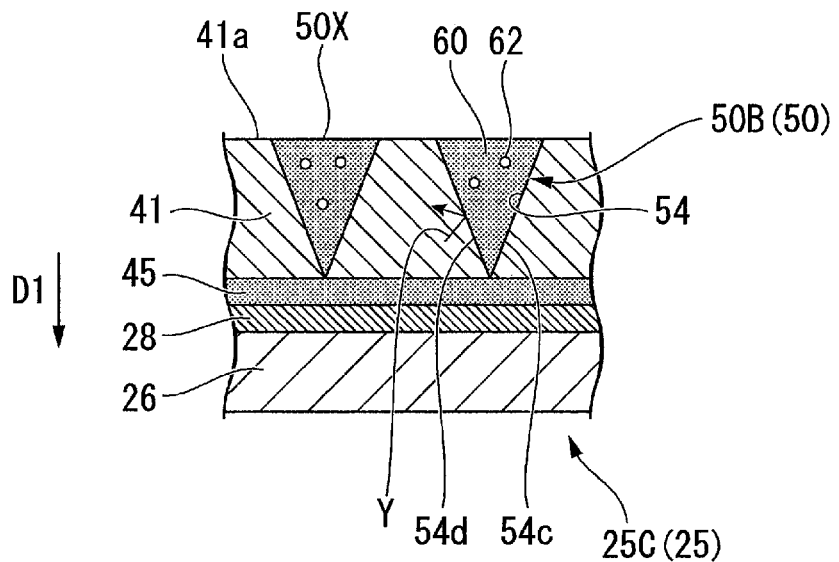
FIG. 7 is a cross-sectional view showing another variation of the phosphor wheel according to the first embodiment.

FIG. 7 is a cross-sectional view showing the configuration of a phosphor wheel 25C as another variation of the first light source apparatus 11 according to the first embodiment (variation of phosphor wheel 25A) and corresponds to the cross-sectional view taken along the line X2-X2 shown in FIG. 3. The phosphor wheel 25C has the same configuration as that of the phosphor wheel 25A, and the grooves 54 that are traveling direction changers 50B are each provided with a light transmissive member 60 and scattering elements 62 held by the light transmissive member 60, as shown in FIG. 7.

The light transmissive member 60 and the scattering elements 62 are not each limited to a specific component and may be any component that can transmit the excitation light E and the fluorescence Y and that provides the effect of suppressing the lateral spread of at least the fluorescence Y at the side surfaces 54c and 54d of each of the grooves 54 based, for example, on the difference in refractive index between the light transmissive member 60 and the wavelength conversion layer 41 and between the scattering elements 62 and the wavelength conversion layer 41. For example, the light transmissive member 60 may be the adhesive layer 45 described above, and examples of the light transmissive member 60 may further include a silicone resin and an epoxy resin. The scattering elements 62 may, for example, be air voids or fine particles made of a resin having a refractive index different from that of the light transmissive member 60.

Figure 8:
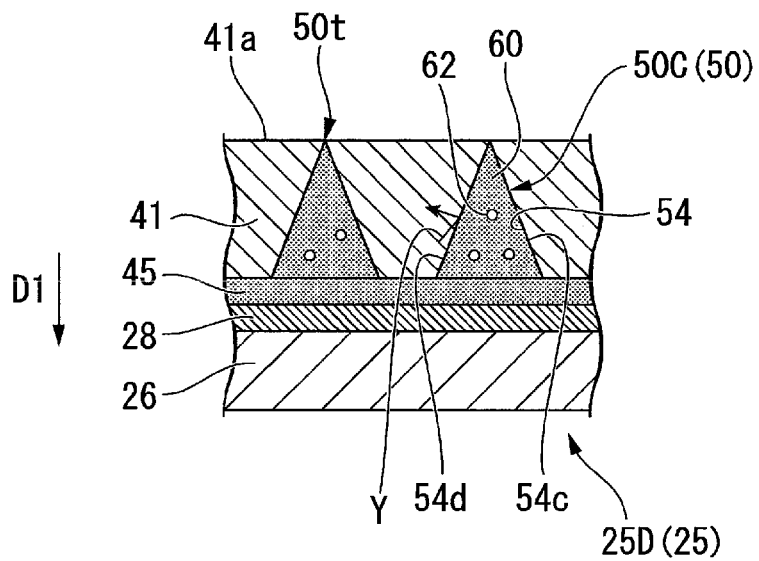
FIG. 8 is a cross-sectional view showing another variation of the phosphor wheel according to the first embodiment.

FIG. 8 is a cross-sectional view showing the configuration of a phosphor wheel 25D as still another variation of the first light source apparatus 11 according to the first embodiment (variation of phosphor wheel 25A) and corresponds to the cross-sectional view taken along the line X2-X2 shown in FIG. 3. The phosphor wheel 25D has the same configuration as that of the phosphor wheel 25C described above, and the grooves 54 that are traveling direction changers 50C are each provided with the light transmissive member 60 and the scattering elements 62 held by the light transmissive member 60, as shown in FIG. 8.

In the phosphor wheel 25D, the traveling direction changers 50C are so formed that the width thereof in the direction along the surface 41a of the wavelength conversion layer 41 increases with distance in the light incident direction D1 from the surface 41a. The lateral spread of the fluorescence Y can therefore be suppressed at the side surfaces 54c and 54d of each of the grooves 54 based, for example, on the difference in refractive index between the grooves 54 and the wavelength conversion layer 41, as in the phosphor wheel 25C. Further, the vertices 50t of the traveling direction changers 50C are flush with the surface 41a of the wavelength conversion layer 41. The traveling direction changers 50C therefore reach the surface 41a in the thickness direction of the wavelength conversion layer 41, whereby the lateral spread of the excitation light E immediately after the incidence thereof on the wavelength conversion layer 41 and the lateral spread of the fluorescence Y immediately before the exit thereof out of the wavelength conversion layer 41 can be reliably suppressed, as in the phosphor wheels 25A, 25B, and 25C. In a case where the efficiency of extraction of the fluorescence Y can be sufficiently suppressed, the vertices 50t of the traveling direction changers 50C may be shifted frontward (toward deeper side) in the light incident direction D1 from the surface 41a of the wavelength conversion layer 41.

Second Embodiment

A light source apparatus and a projector according to a second embodiment will subsequently be described. The second embodiment differs from the first embodiment in terms of the form of the traveling direction changers of the phosphor wheel in the light source apparatus, and the other configurations are the same in the first and second embodiments. Therefore, in the following description, the form of the traveling direction changers will be primarily described, and the configurations and members common to those in the first embodiment have the same reference characters and will not be described in detail.

Figure 9:
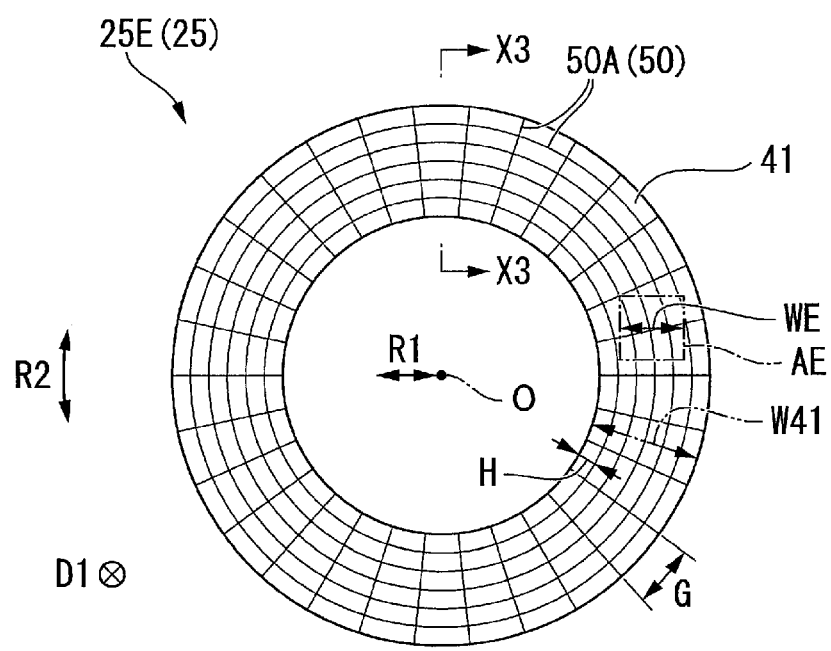
FIG. 9 is a plan view of a phosphor wheel according to a second embodiment and used in the light source apparatus of the illuminator shown in FIG. 2.
Figure 10:
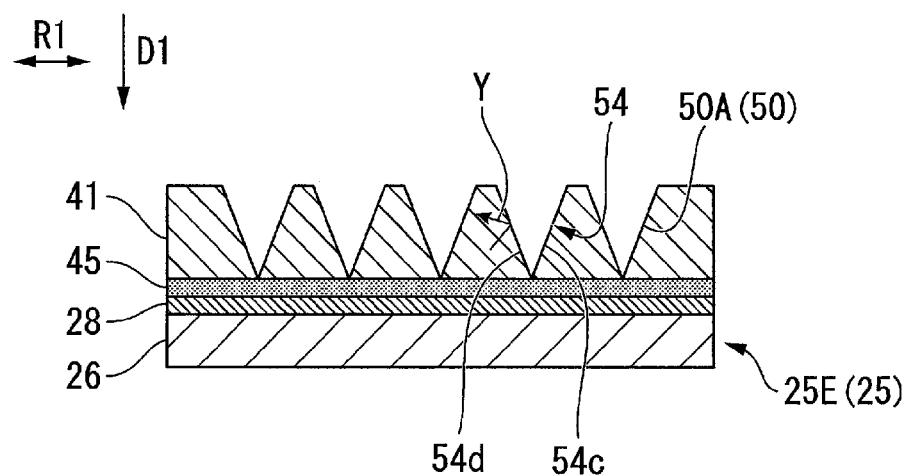
FIG. 10 is a cross-sectional view of the phosphor wheel shown in FIG. 9 taken along the line X3-X3 shown in FIG. 9.

FIG. 9 is a plan view of a phosphor wheel 25E in the second embodiment. FIG. 10 is a cross-sectional view of the phosphor wheel 25E shown in FIG. 9 taken along the line X3-X3 shown in FIG. 9. In the second embodiment, the traveling direction changers 50A are also provided in positions concentrically arranged around the axis of rotation O in addition to the positions described in the first embodiment, as shown in FIGS. 9 and 10. The interval H between the concentrically arranged traveling direction changers 50A in the radial direction R1 is preferably not only smaller than at least the light incident region AE but greater than or equal to the width of the light incident region AE by a factor of 0.1 but smaller than or equal to the width of the light incident region AE by a factor of 10. When the interval H between the traveling direction changers 50A satisfies the condition described above, the number of traveling direction changers 50A contained in the light incident region AE increases, whereby the lateral spread of the fluorescence Y can be suppressed, and the bleeding of the fluorescence Y can be reduced.

The light source apparatus and the projector according to the second embodiment described above provide the following effects.

The light source apparatus and the projector according to the second embodiment, which have the same basic configurations as those of the light source apparatus and the projector according to the first embodiment, provide the same advantageous effects as those provided by the light source apparatus and the projector according to the first embodiment. That is, the light source apparatus according to the second embodiment can satisfactorily change the traveling direction of the fluorescence Y, whereby a change in the size of the region from which the fluorescence Y is emitted from the size of a desired region can be suppressed. A decrease in the efficiency of extraction of the fluorescence Y can thus be suppressed. Further, the projector 1 according to the second embodiment can form and project a high-luminance image by using the light source apparatus that suppresses a decrease in the efficiency of extraction of the fluorescence Y.

Further, in the light source apparatus according to the second embodiment, the traveling direction changers 50A are also provided in a plurality of positions arranged concentrically around the axis of rotation O. As a result, even in a case where the wavelength conversion layer 41 is greater than the width WE of the light incident region AE, which is irradiated with the excitation light E, the number of traveling direction changers 50A contained in the region AE, which is irradiated with the excitation light E, does not change when the substrate 26 is rotated, so that the lateral spread of the fluorescence Y can be effectively suppressed, whereby a decrease in the efficiency of extraction of the fluorescence Y can be suppressed, as in the first embodiment.

The light source apparatus according to the second embodiment can use the same variations of the phosphor wheel in the first embodiment, that is, the phosphor wheels 25C, 25D, and 25E.

Third Embodiment

A light source apparatus and a projector according to a third embodiment will subsequently be described. The third embodiment differs from the first embodiment in terms of the form of the traveling direction changers of the phosphor wheel in the light source apparatus, and the other configurations are the same in the first and third embodiments. Therefore, in the following description, the form of the traveling direction changers will be primarily described, and the configurations and members common to those in the first embodiment have the same reference characters and will not be described in detail.

Figure 11:
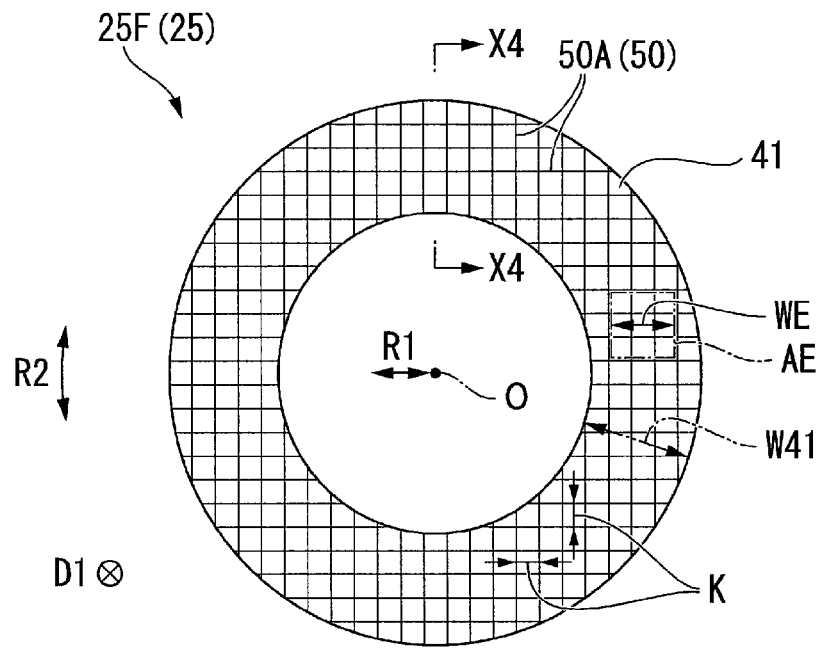
FIG. 11 is a plan view of a phosphor wheel according to a third embodiment and used in the light source apparatus of the illuminator shown in FIG. 2.
Figure 12:
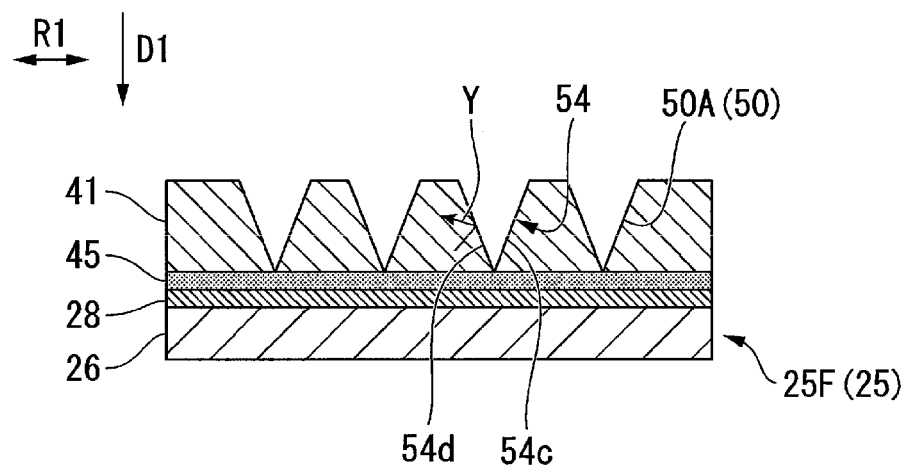
FIG. 12 is a cross-sectional view of the phosphor wheel shown in FIG. 11 taken along the line X4-X4 shown in FIG. 11.

FIG. 11 is a plan view of a phosphor wheel 25F in the third embodiment. FIG. 12 is a cross-sectional view of the phosphor wheel 25F shown in FIG. 11 taken along the line X4-X4 shown in FIG. 11. The traveling direction changers 50A are provided in the form of a lattice and at equal intervals when viewed in the light incident direction D1, as shown in FIGS. 11 and 12. The interval K between the traveling direction changers 50A arranged in the form of a lattice is preferably not only smaller than at least the light incident region AE but greater than or equal to the width of the light incident region AE by a factor of 0.1 but smaller than or equal to the width of the light incident region AE by a factor of 10, as is the interval G. When the interval K between the traveling direction changers 50A satisfies the condition described above, the number of traveling direction changers 50A contained in the light incident region AE increases, whereby the lateral spread of the fluorescence Y can be suppressed, and the bleeding of the fluorescence Y can be reduced.

The light source apparatus and the projector according to the third embodiment described above provide the following effects.

The light source apparatus and the projector according to the third embodiment, which have the same basic configurations as those of the light source apparatus and the projector according to the first embodiment, provide the same advantageous effects as those provided by the light source apparatus and the projector according to the first embodiment. That is, the light source apparatus according to the third embodiment can satisfactorily change the traveling direction of the fluorescence Y, whereby a change in the size of the region from which the fluorescence Y is emitted from the size of a desired region can be suppressed. A decrease in the efficiency of extraction of the fluorescence Y can thus be suppressed. Further, the projector 1 according to the third embodiment can form and project a high-luminance image by using the light source apparatus that suppresses a decrease in the efficiency of extraction of the fluorescence Y.

Further, in the light source apparatus according to the third embodiment, the traveling direction changers 50A are provided in the form of a lattice and at equal intervals when viewed in the light incident direction D1. As a result, even in a case where the wavelength conversion layer 41 is greater than the width WE of the light incident region AE, which is irradiated with the excitation light E, as in the second embodiment, the number of traveling direction changers 50A contained in the region AE, which is irradiated with the excitation light E, does not change when the substrate 26 is rotated, so that the lateral spread of the fluorescence Y can be effectively suppressed, whereby a decrease in the efficiency of extraction of the fluorescence Y can be suppressed, as in the first embodiment.

The arrangement in the form of a lattice described above includes not only, of course, the case where the lines that form the contours of the traveling direction changers 50A are perpendicular to each other when viewed in the excitation light incident direction, as shown in FIG. 11 by way of example, but a wide variety of other cases, such as a case where the contours described above intersect with each other at an arbitrary angle and a case where the contours described above do not intersect with each other in the exact sense but the contours are close enough to each other to provide the function of suppressing the lateral spread of the fluorescence. Further, the shape of each segment defined by the contours of the traveling direction changers 50A when viewed in the light incident direction can be a square shape, an oblong shape, a fan-like shape, a rhombic shape, a circular shape, and a wide variety of other shapes.

The light source apparatus according to the third embodiment can use the same variations of the phosphor wheel in the first embodiment, that is, the phosphor wheels 25C, 25D, and 25E.

Preferable embodiments of the invention have been described above in detail. The invention is, however, not limited to a specific embodiment, and a variety of modifications and changes can be made to the embodiments within the scope of the substance of the invention set forth in the appended claims.

For example, in each of the embodiments described above, the projector 1 including the three light modulators 4R, 4G, and 4B is presented by way of example. Instead, the projector 1 according to each of the embodiments of the invention may be a projector that uses a single light modulator to display color video images. Further, a digital micromirror device may be used as each of the light modulators.

The entire disclosure of Japanese Patent Application No. 2018-061409, filed on Mar. 28, 2018 is expressly incorporated by reference herein.

What is claimed is:

1. A light source apparatus comprising:
an excitation light source that outputs excitation light;
a wavelength conversion layer on which the excitation light is incident and which converts a wavelength of the excitation light to emit fluorescence;
a plurality of traveling direction changers that are formed in the wavelength conversion layer and change a traveling direction of the fluorescence; and
a substrate on which the wavelength conversion layer is provided,
wherein the substrate is rotated around an axis of rotation to change a position on which the excitation light is incident on the wavelength conversion layer over time, and
an interval between the plurality of traveling direction changers is smaller than a size of a region on which the excitation light is incident, the excitation light being incident within the region without being incident on areas outside the region.

2. The light source apparatus according to claim 1,
wherein the plurality of traveling direction changers are so provided as to radially extend from the axis of rotation when viewed in a direction in which the excitation light is incident.

3. The light source apparatus according to claim 2,
wherein a width of the wavelength conversion layer in a radial direction extending from the axis of rotation is roughly equal to the size of the region on which the excitation light is incident.

4. The light source apparatus according to claim 2,
wherein the plurality of traveling direction changers are so provided as to be concentric around the axis of rotation.

5. The light source apparatus according to claim 1,
wherein the plurality of traveling direction changers are provided in a form of a lattice when viewed in a direction in which the excitation light is incident.

6. The light source apparatus according to claim 1,
wherein the plurality of traveling direction changers are so formed that a width thereof in a direction along a surface of the wavelength conversion layer that is a surface on which the excitation light is incident decreases with distance from the surface in a direction in which the excitation light is incident.

7. The light source apparatus according to claim 6,
wherein a surface of each of the plurality of traveling direction changers that is a surface on which the excitation light is incident is flush with the surface of the wavelength conversion layer that is the surface on which the excitation light is incident.

8. The light source apparatus according to claim 1,
wherein the plurality of traveling direction changers are so formed that a width thereof in a direction along a surface of the wavelength conversion layer that is a surface on which the excitation light is incident increases with distance from the surface in a direction in which the excitation light is incident.

9. The light source apparatus according to claim 8,
wherein a vertex of each of the plurality of traveling direction changers is flush with the surface of the wavelength conversion layer that is the surface on which the excitation light is incident.

10. The light source apparatus according to claim 1,
wherein the plurality of traveling direction changers are a plurality of grooves formed in the wavelength conversion layer and extending in a direction in which the excitation light is incident.

11. The light source apparatus according to claim 10,
wherein the plurality of grooves are each provided with a light transmissive member and scattering elements held by the light transmissive member.

12. A projector comprising:
the light source apparatus according to claim 1;
a light modulator that modulates light from the light source apparatus in accordance with image information to form image light; and
a projection system that projects the image light.

13. A projector comprising:
the light source apparatus according to claim 2;

a light modulator that modulates light from the light source apparatus in accordance with image information to form image light; and a projection system that projects the image light.

14. A projector comprising:

the light source apparatus according to claim 3;

a light modulator that modulates light from the light source apparatus in accordance with image information to form image light; and a projection system that projects the image light.

15. A projector comprising:

the light source apparatus according to claim 4;

a light modulator that modulates light from the light source apparatus in accordance with image information to form image light; and a projection system that projects the image light.

16. A projector comprising:

the light source apparatus according to claim 5;

a light modulator that modulates light from the light source apparatus in accordance with image information to form image light; and a projection system that projects the image light.

17. A projector comprising:

the light source apparatus according to claim 6;

a light modulator that modulates light from the light source apparatus in accordance with image information to form image light; and a projection system that projects the image light.

18. A projector comprising:

the light source apparatus according to claim 7;

a light modulator that modulates light from the light source apparatus in accordance with image information to form image light; and a projection system that projects the image light.

19. A projector comprising:

the light source apparatus according to claim 8;

a light modulator that modulates light from the light source apparatus in accordance with image information to form image light; and a projection system that projects the image light.

20. A projector comprising:

the light source apparatus according to claim 10;

a light modulator that modulates light from the light source apparatus in accordance with image information to form image light; and a projection system that projects the image light.

\* \* \* \* \*